United States Patent [19]

Kuramoto et al.

[11] Patent Number: 5,437,515
[45] Date of Patent: Aug. 1, 1995

[54] CONNECTING PIN

[75] Inventors: Kikuzo Kuramoto, Chiba; Yoshiyuki Suzuki, Ibaragi, both of Japan

[73] Assignee: Nisso Sangyo Co., Ltd., Chiba, Japan

[21] Appl. No.: 143,477

[22] Filed: Oct. 26, 1993

[30] Foreign Application Priority Data

Oct. 28, 1992 [JP] Japan ............................ 4-080722 U

[51] Int. Cl.⁶ .............................................. F16B 19/00
[52] U.S. Cl. ..................................... 403/154; 403/96; 403/324; 411/340
[58] Field of Search ............... 403/323, 324, 321, 161, 403/162, 49, 154–155, 157, 91–92, 96, 84; 411/340, 345

[56] References Cited

U.S. PATENT DOCUMENTS

| 325,221 | 8/1885 | Wright | 403/154 X |
|---|---|---|---|
| 1,500,132 | 7/1924 | Hummelgard | 403/96 X |
| 1,732,508 | 10/1929 | Farris | 403/96 |
| 3,516,644 | 6/1970 | Horgan, Jr. | 403/321 X |
| 3,861,267 | 1/1975 | Collister | 411/345 |
| 4,004,393 | 1/1977 | Morris | 403/49 X |
| 4,822,197 | 4/1989 | DeMartino et al. | 403/154 |
| 5,112,155 | 5/1992 | Jackson | 403/49 |

FOREIGN PATENT DOCUMENTS

| 58-49323 | 11/1983 | Japan . | |
|---|---|---|---|
| 1318295 | 5/1973 | United Kingdom | 411/340 |
| 581332 | 11/1977 | U.S.S.R. | 403/324 |

Primary Examiner—Eric K. Nicholson
Assistant Examiner—Harry C. Kim
Attorney, Agent, or Firm—McGlew and Tuttle

[57] ABSTRACT

A connecting pin has a body of great strength which will not come off position when locked and will not be caught on the way of insertion and removal.

In the connecting pin, a flange 10 for locking is provided on the rear end of a column-like body. A long hole 11 is formed through in the shank part on the forward end side of the body. A shaft 12 is inserted in the shank part on the forward end side of the body in a direction intersecting the long hole and opposed two holes 17 are formed in parallel with this shaft. A lock piece 13 supported on the aforesaid shaft at a midway point and having a plurality of slots 16 in both sides is rotatably inserted and in the hole is inserted a positioning member which selectively engages in one of the slots.

7 Claims, 4 Drawing Sheets

CONNECTING PIN

FIELD OF THE INVENTION

The present invention relates to a connecting pin used in construction and civil engineering works for connecting two pipe posts, two flat boards, and so forth.

BACKGROUND OF THE INVENTION

Such connecting means for construction and civil engineering works are known in the prior art in which, when extensible pipe post consisting of an outer tube and an inner tube, two flat boards, and so forth are to be connected, opposed holes are formed in two members as disclosed in for example U.S. Pat. No. 4,348,790, and Japanese Utility Model Publication No. 58-49323, and into these holes are inserted a so-called gravity lock pin for the purpose of connecting both.

The gravity lock pin A as the connecting means is provided with a halved-type cut C in the forward end of a round bar-type body B as shown in FIG. 6, and in this cut C is rotatably installed an engaging piece E through a pivot D, so that the pin A may be inserted into holes of two members to be connected, and after insertion, a lock piece E may rotate out on one side of the shank of the body B, thereby locking with a lock part F.

Since the prior-art pin A has the halved-type cut C formed in the forward end, the forward end part has a low strength, being subject to a crack or a failure.

Furthermore since the lock piece E rotates out only on one side of the shank part of the body B, a force to lock the pin is weak, and accordingly a force in a direction of pulling out is low, resulting in an accidental fall of the pin A in the event that the lock piece E moves toward the inside of the cut C.

Furthermore, in the case of connection between hollow pipes, if this lock piece E moves out, on the way of insertion, with its weight from the shank part of the body in this pipe, the lock piece E will be caught by the inner wall of the pipe, with the result that it will become impossible to remove the pin.

SUMMARY OF THE INVENTION

It is, therefore, an object of the present invention to provide a connecting pin having a great body strength.

It is another object of the present invention to provide a connecting pin which will not accidentally come off during use for a locking purpose.

It is further another object of the present invention to provide a connecting pin which will not be caught on the way of insertion and removal.

Another object of the present invention resides in the provision of a connecting pin the lock piece of which can easily be changed in angle with fingers.

Further another object of the present invention resides in the provision of a connecting pin which is capable of holding the position of stowage of the lock piece.

Further another object of the present invention resides in the provision of a connecting pin which is capable of holding the lock piece in a lock position.

To accomplish the above-mentioned objects, the constitution of the present invention is characterized in that a flange for locking is provided on the rear end of a column-like body; a long hole is formed through in the shank part on the forward end side of the body; a shaft is inserted in the shank part on the forward end side of the body in a direction intersecting the long hole; opposed two holes are formed in parallel with this shaft; a lock piece supported on the aforesaid shaft at a midway point and having a plurality of slots formed in both sides is rotatably inserted; and in the hole is inserted a positioning member which selectively engages in one of the slots.

After insertion of the body in the holes of the two members to be connected, the lock piece is turned to protrude out so as to intersect the body.

At this time, the positioning member is engaged in one of the slots of the lock piece to lock the lock piece, thereby preventing the dislocation of the body from the connected members by this lock piece and connecting the two members to be connected.

The lock piece is held by the positioning member from protruding out of the long hole when the body is inserted into the hole of the connected members, thus preventing the pin body from being caught in the hole of the members connected.

DETAILED DESCRIPTION OF THE PREFERRED EMBODIMENT

Hereinafter one exemplary embodiment of a connecting pin according to the present invention will be explained.

The connecting pin 1 of the present invention is used for connecting such members as two pipe posts, flat boards and so forth.

Figure 5:
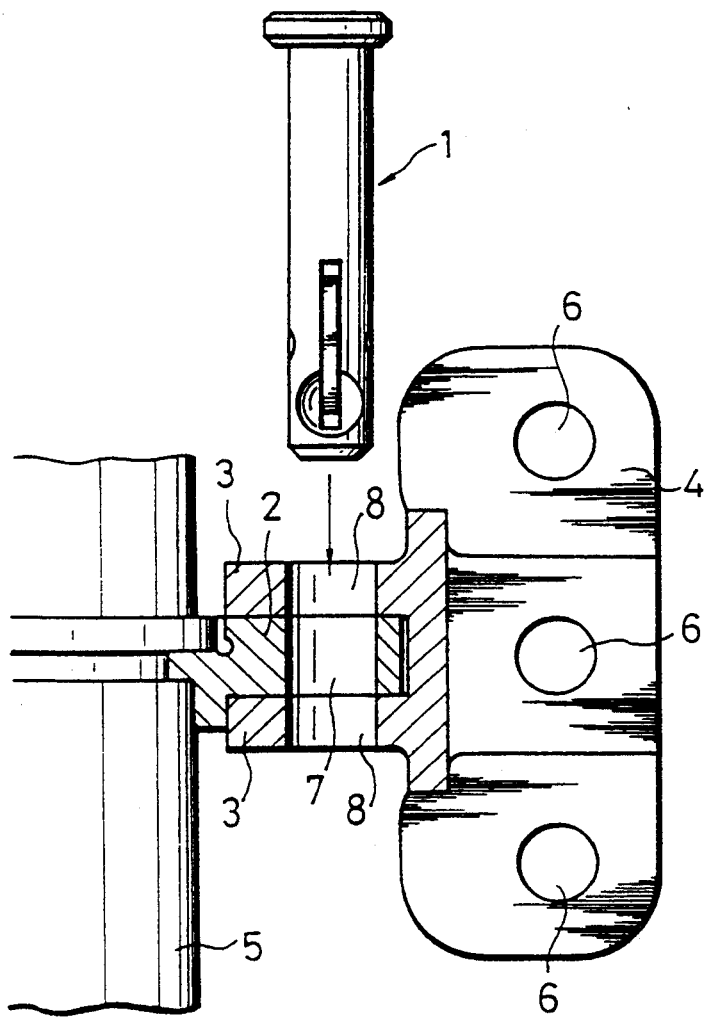
FIG. 5 is a front view showing the connecting pin in a mounted state.
Figure 6:
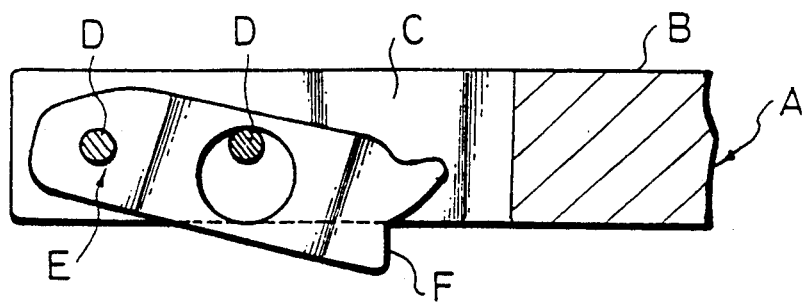
FIG. 6 is a front view, partly longitudinally sectioned, of a prior-art connecting pin.

For example, when, as shown in FIG. 5, a multiple-hole flange 2 is secured on the outside periphery of a column 5, a bracket 4 is secured to this flange 2 through holding plates 3, 3, and a horizontal board and a diagonal board are connected through holes 6, the connecting pin 1 is inserted into a hole 7 of the flange 2 and into holes 8, 8 of the holding plates 3, 3.

The connecting pin 1 comprises a bar having a round section or a square column-like body 9, a lock flange 10 provided integrally on the rear end of the body 9, a long hole or passage 11 provided vertically through in the shank part on the forward end of the body 9 with radial openings, a flat plate-type lock piece 13 rotatably inserted into the hole 11 through a pivot shaft 12, balls 14, 14 inserted in the shank part of the body 9, springs 15, 15 for pressing the balls 14, 14 in the direction of the lock piece 13, and slots or depressions 16, 16 in the outside surface of the lock piece 13 which selectively engages with the balls 14, 14.

The ball 14 and the spring 15 constitute positioning members or means. As other positioning members used may be rubber or other elastic members.

The pivot shaft 12 is inserted in a direction meeting at right angles the lock piece 13, through at the center of the lock piece 13, with both ends of the lock piece 13 fully stowed within the long hole 11, or protruding out in a direction meeting at right angles the body 9.

That is, with the lock piece 13 stowed within the long hole 11 of the body 9, the pin is inserted into the holes 7 and 8 shown in FIG. 5, and after insertion, both sides of the lock piece 13 are protruded outwardly. Furthermore, the lock piece 13 is held in contact with the outside surface of the hold plate 3 to keep the part in position. In this case, the lock piece 13, being stowed within the body, will not be caught by the inner wall of the holes 7 and 8.

There are formed two positioning holes 17, 17 parallelly formed to the shaft 12. In each of these holes 17, 17 are inserted the balls 14, 14, the springs 15, 15, and plugs 18, 18. The springs 15, 15 constantly press the balls 14, 14 toward the outside surface of the lock piece 13.

In both side surfaces of the lock piece 13 are formed a plurality of slots 16, 16 for locking for example at four places. The balls 14, 14 enter the two slots in a horizontal direction to lock the lock piece 13 for example when the lock piece 13 moves out at a right angle.

Figure 1:
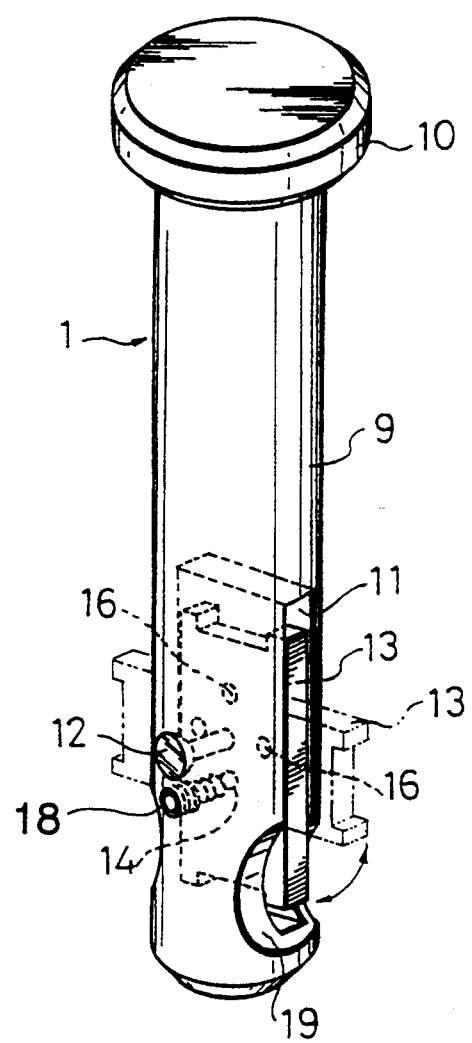
FIG. 1 is a perspective view of a connecting pin pertaining to the present invention.
Figure 2:
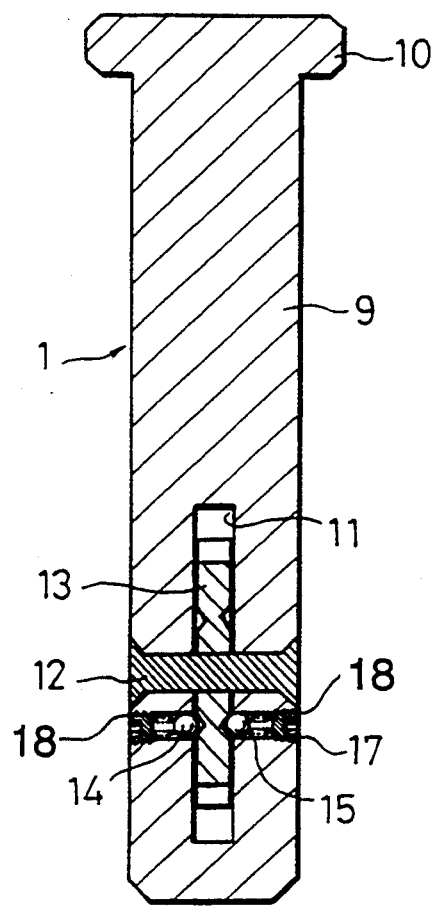
FIG. 2 is a longitudinal sectional front view of FIG. 1.
Figure 3:
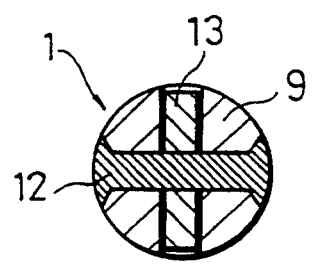
FIG. 3 is a transverse sectional view of FIG. 1.
Figure 4:
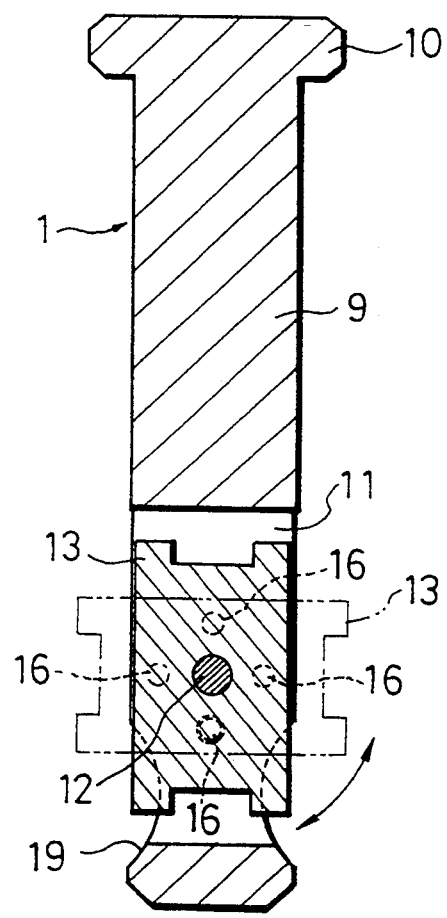
FIG. 4 is a longitudinal sectional side view of FIG. 1.

To withdraw the lock piece 13 into the long hole 11, the balls 14, 14 are engaged in the other two slots 16, 16 in a vertical direction as indicated by a full line in FIG. 4.

Near the forward end of the body 9 is formed an access slot 19 having a semi-conical section connected to the long hole 11; the lock piece 13 can easily be pushed out of the long hole 11 with a finger inserted into this slot 19.

According to the present invention, the connecting pin has the following advantages.

1) The pin body, being a column-like body having no cut in the forward end, has so high a strength as to prevent cracking and breakage.

2) The lock piece is supported at its midway part by a shaft, and a long hole is formed through in the body; therefore it is possible to protrude both ends of the lock piece out of the long hole, intersecting the body at a right angle. Both ends of the lock piece, therefore, can be held in contact with the outside surface of the connected members at the time of locking, thus insuring reliable locking the pin in position.

3) The lock piece is positioned by a positioning member and prevented from loitering. Since the lock piece can be stopped exactly in the lock position, the connecting pin is locked with higher reliability. Furthermore the lock piece can be stowed within the long hole; the lock piece, properly positioned by the positioning member during stowage, can be smoothly moved in and out without being caught by the inner wall of the hole when inserted into, or pulled out of, the hole of the connected members.

4) Since a semi-conical slot is provided contiguously to the long hole, the lock piece can easily be moved in and out while changing its angle with a finger inserted.

What is claimed is:

1. A connecting pin comprising:
a bar with a first and second end, said bar including a flange at said first end and said bar defining a passage at said second end:
a pivot shaft intersecting said passage;
a locking piece rotatably supported by said pivot shaft in said passage, said locking piece defining a plurality of depressions;
positioning means for selectively engaging with said depressions on said lock piece, said positioning means being positioned substantially parallel with said pivot shaft;
said bar defining an access slot at said second end, said access slot being contiguous to said passage.

2. A connecting pin in accordance with claim 1, wherein: said access slot is semi-conical.

3. A connecting pin in accordance with claim 1, wherein:
one of said plurality of depressions is positioned with respect to said positioning means for securing said locking piece in a position where said locking piece is substantially completely located inside said bar, and another one of said plurality of depressions is positioned with respect to said positioning means for securing said locking piece in a position where said locking piece extends outside said bar.

4. A connecting pin in accordance with claim 3, wherein:
said locking piece is substantially perpendicular to said bar in said position extending outside said bar.

5. A connecting pin comprising:
a bar with a first and second end, said bar including a flange at said first end and said bar defining a passage at said second end:
a pivot shaft intersecting said passage;
a locking piece rotatably supported by said pivot shaft in said passage, said locking piece defining a plurality of depressions;
positioning means for selectively engaging with said depressions on said lock piece, said positioning means being positioned substantially parallel with said pivot shaft, said positioning means includes a positioning hole defined by said bar and extending substantially parallel to said pivot shank, said positioning means also including a ball positioned in said positioning hole and including a spring biasing said ball against said locking piece.

6. A connecting pin comprising:
a bar with a first and second end, said bar including a flange at said first end and said bar defining a passage at said second end;
a pivot shaft intersecting said passage;
a locking piece rotatably supported by said pivot shaft in said passage, said locking piece defining a plurality of depressions;
positioning means for selectively engaging with one of said plurality of depressions for securing said locking piece in a position where said locking piece is substantially completely located inside said bar, said positioning means also selectively engaging with another one of said plurality of depressions for securing said locking piece in a position where said locking piece extends outside said bar.

7. A connecting pin in accordance with claim 6; wherein:
said positioning means is positioned substantially parallel with said pivot shaft.

* * * * *